United States Patent
Mikkelsen et al.

(10) Patent No.: US 10,243,425 B2
(45) Date of Patent: Mar. 26, 2019

(54) MOTOR HOUSING WITH ELECTRONIC HOUSING BOTH HAVING VERTICAL PARTIAL COOLING RIBS FOR WET-RUNNING MOTOR FOR A CENTRIFUGAL PUMP

(71) Applicant: GRUNDFOS HOLDING A/S, Bjerringbro (DK)

(72) Inventors: Knud Jørgen Saaby Mikkelsen, Ans by (DK); Bjørn Breitzke, Bjerringbro (DK); Steen Heelund, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 215 days.

(21) Appl. No.: 14/377,319

(22) PCT Filed: Feb. 7, 2013

(86) PCT No.: PCT/EP2013/052369
§ 371 (c)(1),
(2) Date: Aug. 7, 2014

(87) PCT Pub. No.: WO2013/117613
PCT Pub. Date: Aug. 15, 2013

(65) Prior Publication Data
US 2015/0001973 A1 Jan. 1, 2015

(30) Foreign Application Priority Data
Feb. 8, 2012 (EP) .................................... 12154494

(51) Int. Cl.
*H02K 5/00* (2006.01)
*H02K 5/18* (2006.01)
(Continued)

(52) U.S. Cl.
CPC ............... *H02K 5/18* (2013.01); *F04D 13/06* (2013.01); *F04D 29/5806* (2013.01);
(Continued)

(58) Field of Classification Search
CPC .. F04D 29/5806; F04D 29/5813; F04D 29/58; F04D 1/00; H02K 5/18; H02K 5/22; H02K 5/20
(Continued)

(56) References Cited

U.S. PATENT DOCUMENTS 4,642,499 A * 2/1987 Brem ...................... H02K 5/124
310/89
5,585,681 A * 12/1996 Bitsche .................... B60K 1/00
310/54
(Continued)

FOREIGN PATENT DOCUMENTS

DE 200 04 905 U1 6/2000
DE 200 07 099 U1 9/2000
(Continued)

OTHER PUBLICATIONS

D.D.L Chung, Materials for Thermal Conduction, Jan. 31, 2001. Composite Materials Research Laboratory, State University of New York at Buffalo. Table in p. 2.*
(Continued)

*Primary Examiner* — Bernard Rojas
*Assistant Examiner* — Maged M Almawri
(74) *Attorney, Agent, or Firm* — McGlew and Tuttle, P.C.

(57) ABSTRACT

An electric motor includes a motor housing (5) which includes cooling ribs (15) on the peripheral side leading away heat arising in the motor. The cooling ribs (15) only extend over a part of the periphery of the motor housing (5), so that cooling ribs (21) of the electronics housing (13) have space in the cooling-rib-free part of the motor housing (5).
(Continued)

The cooling ribs (21) of the electronics housing (13) are arranged aligned with the cooling ribs (15) of the motor transversely to a motor axis (14).

20 Claims, 4 Drawing Sheets

(51) Int. Cl.
    *F04D 29/58*     (2006.01)
    *F04D 13/06*     (2006.01)
    *H02K 5/22*     (2006.01)
    *H02K 9/19*     (2006.01)
    *H02K 11/33*     (2016.01)
    *H02K 5/128*     (2006.01)
    *H02K 7/14*     (2006.01)

(52) U.S. Cl.
    CPC ........... *F04D 29/5813* (2013.01); *H02K 5/22* (2013.01); *H02K 9/19* (2013.01); *H02K 11/33* (2016.01); *H02K 5/128* (2013.01); *H02K 7/14* (2013.01)

(58) Field of Classification Search
    USPC .............................. 310/54, 64, 89, 62, 52, 71
    See application file for complete search history.

(56) References Cited

U.S. PATENT DOCUMENTS

| | | | |
|---|---|---|---|
| 5,714,816 A * | 2/1998 | Jensen | H02K 11/33 310/64 |
| 5,798,596 A * | 8/1998 | Lordo | H02K 1/278 310/156.12 |
| 7,525,224 B2 * | 4/2009 | Takenaka | H02K 5/20 310/52 |
| 2002/0076337 A1 * | 6/2002 | Rexroth | F04D 29/588 417/365 |
| 2003/0161742 A1 * | 8/2003 | Lin | F04D 29/5893 417/410.1 |
| 2005/0253465 A1 * | 11/2005 | Takenaka | H02K 5/20 310/52 |
| 2006/0104833 A1 * | 5/2006 | Hueppchen | F04B 39/066 417/372 |
| 2009/0289513 A1 * | 11/2009 | Vadillo | H02K 9/14 310/62 |
| 2010/0127602 A1 * | 5/2010 | Rueggen | H02K 11/33 310/68 D |
| 2010/0237722 A1 * | 9/2010 | Schmidt | H02K 11/33 310/52 |
| 2011/0074235 A1 * | 3/2011 | Leung | H02K 9/14 310/62 |
| 2013/0026866 A1 * | 1/2013 | Morisaki | H02K 5/08 310/51 |

FOREIGN PATENT DOCUMENTS

DE     10 2005 032969 A1     2/2007
DE     102005032969 A1 *     2/2007   ............... H02K 9/06

OTHER PUBLICATIONS

EPO Translation of Patent DE 102005032969.*
DE 102005032969 A1 english Translation.*

* cited by examiner

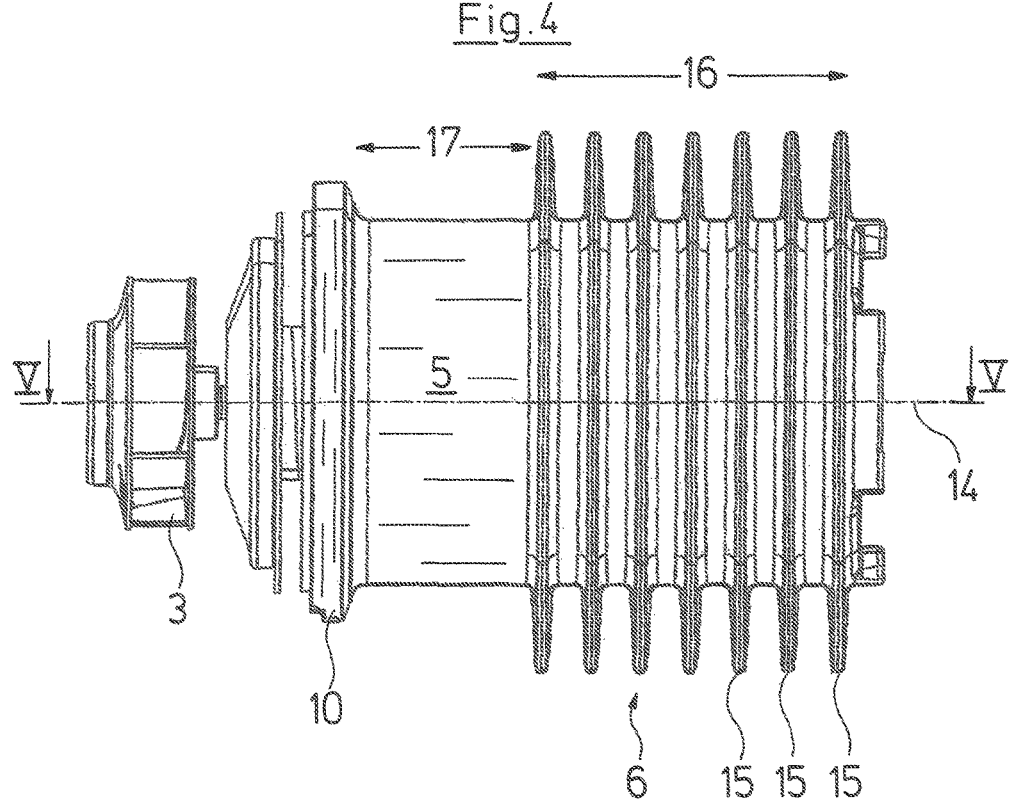
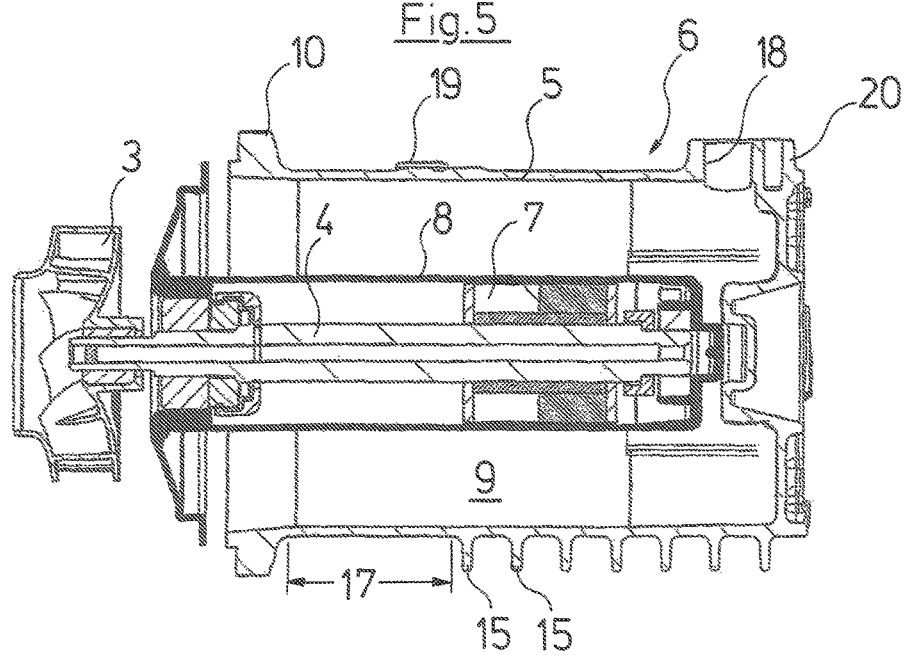

MOTOR HOUSING WITH ELECTRONIC HOUSING BOTH HAVING VERTICAL PARTIAL COOLING RIBS FOR WET-RUNNING MOTOR FOR A CENTRIFUGAL PUMP

CROSS REFERENCE TO RELATED APPLICATIONS

This application is a United States National Phase Application of International Application PCT/EP2013/052369 filed Feb. 7, 2013 and claims the benefit of priority under 35 U.S.C. § 119 of European Patent Application EP 12154494.4 filed Feb. 8, 2012, the entire contents of which are incorporated herein by reference.

FIELD OF THE INVENTION

The invention relates to an electric motor, in particular wet-running motor for the drive of a centrifugal pump, with a rotor, with a motor shaft which is rotatably arranged in a stator comprising motor windings, with a motor housing which receives the stator and which comprises cooling ribs on a peripheral side for leading away heat arising in the motor.

BACKGROUND OF THE INVENTION

It is counted as belonging to the state of the art, to provide electric motors with cooling ribs over the complete periphery of their motor housing, in order to lead away waste heat occurring in the electric motor on operation, wherein these cooling ribs are arranged more or less parallel to the longitudinal axis of the motor and are to lead away the motor heat by way of convection cooling. This is often encouraged by a fan wheel which is seated on the motor shaft and which axially sucks air via a fan cowl and then leads it along the cooling ribs, in order in this manner to lead away the waste heat of the motor via this airflow.

In the meanwhile, with increasingly smaller power electronics, electric motors, in particular for drive of centrifugal pumps, which in the terminal box provided on the electric motor and initially serving exclusively for the electrical connection of the motor, contain electronic circuits and in particular also power electronics, typically those of an electronic speed controller for the motor, have established themselves. The terminal box thereby with modern motors simultaneously forms an electronics housing. However, the waste heat of such power electronics used today lies in a magnitude to that of the motor waste heat, which is why it is counted as belonging to the state of the art, to not only provide the electric motor itself with cooling ribs, but also the terminal box, thus the electronics housing located therein. Thereby, it has been found to be advantageous to likewise let the cooling ribs of the electronics housing run in the longitudinal direction of the motor, thus parallel to the longitudinal ribs of the motor, in order thus to also cool the electronics housing with the cooling airflow of the motor.

With modern permanent magnet rotors, the waste heat of the motor due to the comparatively good efficiency is significantly lower for example than with asynchronous motors or direct current motors. With this, the cooling requirement, in particular with motors controlled by speed controller, shifts from the motor housing to the electronics housing. The cooling ribs are dimensioned in a smaller manner in accordance with the reduced cooling requirement of the motor, which however tends to be somewhat disadvantageous for the cooling of the electronics housing.

SUMMARY OF THE INVENTION

Against this background, it is an object of the invention, to improve an electric motor of the type according to the preamble, with regard to the cooling rib design, whilst taking into account the above discussed problems.

According to the invention, and electric motor, such as a centrifugal pump electric motor is provided comprising a stator, comprising motor windings, a motor shaft, a rotor connected with the motor shaft, the rotor being rotatably arranged in the stator and a motor housing. The motor housing defines an interior space. The stator and the motor and at least a portion of the motor shaft is disposed in the interior space. The motor housing has an exterior with cooling ribs extending only over a part of the periphery of the motor housing and defining a ribbed peripheral region and defining a remaining non-ribbed peripheral region. The cooling ribs lead heat way from the housing arising in the motor.

The electric motor according to the invention, which in particular is designed as a wet-running motor for the drive of a centrifugal pump, comprises a rotor with a motor shaft which is rotatably arranged in a stator comprising motor windings. The electric motor is equipped with a motor housing which receives the stator and which on the peripheral side comprises cooling ribs for leading away the heat arising in the motor. According to the invention, the cooling ribs extend only over a part of the periphery of the motor housing.

The basic concept of the present invention is not to rib the motor housing in a complete manner or at least over the regions, with which this is possible with regard to design, as is usual with the state of the art, but to intentionally leave a part of the periphery of the motor housing without cooling ribs. Thus, the cooling ribs are not reduced in size, but instead comparatively large cooling ribs are provided, which however only extend over a part of the periphery of the motor housing. The aim and purpose of this arrangement on the one hand is to create free spaces on the motor with regard to the design and on the other hand to create free spaces for cooling ribs of the electronics housing, in particular in the regions, in which no cooling ribs are provided on the motor housing side. Such a design is advantageous in particular for electric motors which comprise a rotor carrying permanent magnets and produce comparatively little waste heat. The design according to the invention is thus particularly advantageous for permanent magnet motors which are designed as wet-running motors and are envisaged for driving a centrifugal pump, since on account of the pump housing connecting to the motor housing, the cooling airflows can be led only in the region of the motor housing itself, and this only being where the incoming flow and outgoing flow are not inhibited by the connected pump housing.

According to an advantageous further development of the invention, the motor housing has a round, preferably circular cross section and is only ribbed on the peripheral side. Such an arrangement typically necessitates the motor being held by way of the pump housing, thus requires no stand feet. Such a motor housing which is circular in cross section on the one hand is particularly compact and on the other hand has a uniform heat distribution out from the inside, since the stator bears at an equal distance on all sides. The ribbing only on the peripheral side is advantageous and reduces the axial construction length of the motor.

According to a particularly advantageous design of the invention, the cooling ribs on the motor do not extend in the longitudinal direction of the motor axis as is usual, but transversely to the motor axis. It is particularly the case with an arrangement of the motor with a horizontal motor axis, that by way of this, a convection flow can form along the cooling ribs, which uniformly flows around the motor housing from the bottom to the top.

It is particularly advantageous if the cooling ribs extend only in a range between 190°-240° of the periphery of the motor housing, since then a surface formed parallel to the motor axis remains, which with regard to the design can be used for measures other than for the cooling of the motor. Thereby, it is advantageous if the cooling rib arrangement is designed such that with a horizontally lying motor, the ribs in each case extend from the lower side clockwise or anti-clockwise around the motor housing over an angle of 95°-120°, so that a type of free platform remains on the upper side, in particular if the height of the ribs is selected larger towards the run-out end than in the remaining region.

According to an advantageous design of the invention, the cooling ribs of the motor housing not only extend over a part of the periphery, but moreover over only a longitudinal section of the motor housing, so that a further longitudinal section remains, which is designed in a rib-free manner. Such a rib-free design is particularly advantageous in the region of the connection to the pump housing, since a very compact pump design can be achieved by way of this, and in particular with an inline housing provided with connection flanges, the distance of the flanges or the pump housing lying therebetween can be selected in a small manner.

Advantageously, the motor housing according to a further design of the invention, in the non-ribbed peripheral region forms an assembly base for an electronics housing which comprises power electronics for the control of the motor, typically at least the power electronics of an electronic speed controller, in particular of a frequency converter. Such an arrangement is advantageous, since on the one hand it provides a comparatively large free space for the electronics housing, and on the other hand, with regard to design, it utilizes the region of the motor housing which is without cooling ribs in an ideal manner.

In order, in particular to integrate the cooling of the electronics housing assembled on the motor housing into the motor cooling or to ensure that a convection airflow cools the motor housing as well as the electronics housing, it is advantageous if the electronics housing comprises cooling ribs towards the motor housing which are arranged flush or in an aligned manner to the cooling ribs on the motor side. Then it is particularly with a horizontal axis arrangement of the motor and with an electronics housing lying at the top, that an intensive convection flow is formed, which firstly coming from the lower side brushes around the motor housing and then around the aligned cooling ribs of the electronics housing. Due to the fact that the waste heat of the motor is lower than that of the motor power electronics with modern permanent magnet motors, such an arrangement is also advantageous inasmuch as this is concerned, since the air brushing past the motor is not yet heated to such an extent that it can no longer not absorb any more heat from the cooling ribs of the electronics housing.

It is particularly advantageous if the motor housing and/or the electronics housing as a cast housing that consists of high thermally conductive material, preferably of a light metal alloy. Thereby, the thermal conductivity of the material should be at least 10 W/m·K at 0° C., preferably at least 100 W/m·K at 0° C., in order to ensure an intensive heat removal in this region of the motor and electronics housing.

The invention is hereinafter explained in more detail by way of an embodiment example represented in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 4 is a view of the electric motor from below; and

FIG. 5 is a longitudinal sectional view along section line V-V in FIG. 4.

DESCRIPTION OF THE PREFERRED EMBODIMENTS

Figure 1:
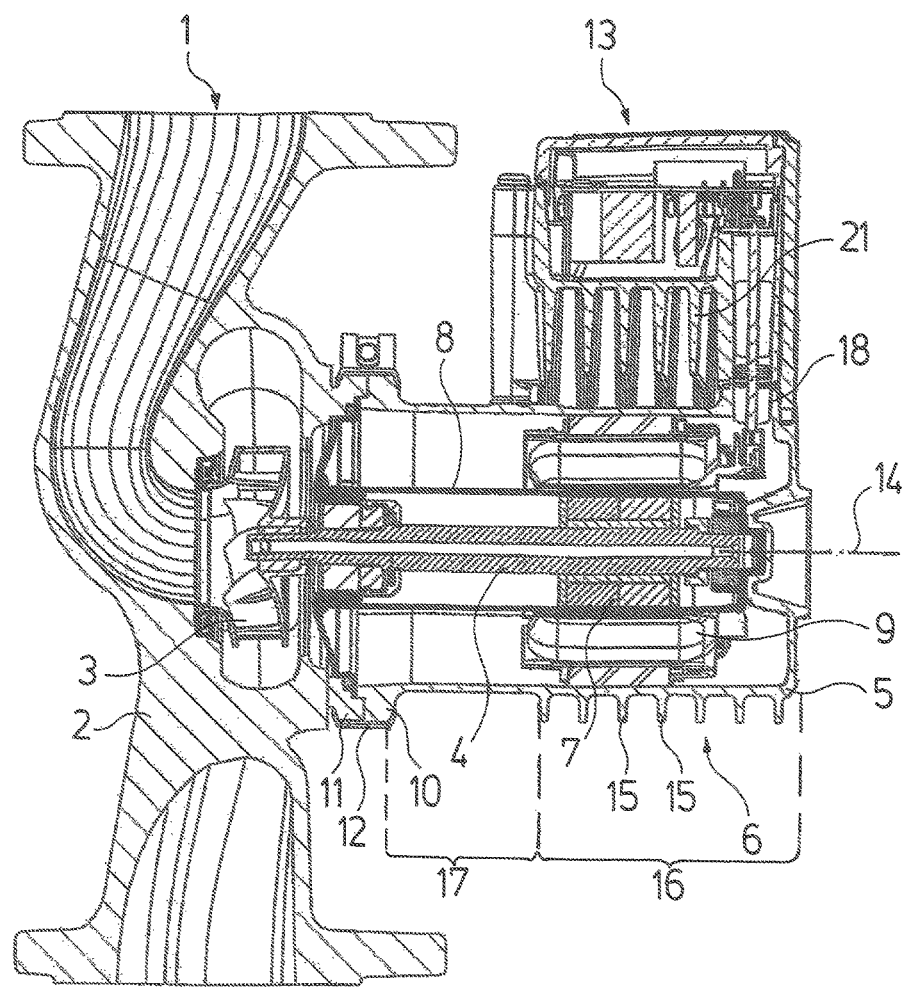
FIG. 1 is a greatly schematized longitudinal sectional representation, an electric motor with a centrifugal pump connected thereto.

Referring to the drawings in particular, the centrifugal pump assembly represented by way of FIG. 1 comprises a centrifugal pump 1 with a pump housing 2 and with an impeller 3 which is rotatably arranged therein and which is seated on a shaft 4 of a motor housing 5 of an electric motor 6 which connects to the pump housing 2. With regard to the electric motor 6 it is the case of a wet-running motor, i.e. the space, in which the rotor 7 runs with the shaft 4, is filled with fluid and is separated from the stator 9 in a fluid-tight manner by a can 8. The stator 9 is seated in the motor housing 5 which is circular in cross section and which is releasably connected by way of a flange 10 to a flange 11 of the pump housing via a clamping ring 12.

With regard to the electric motor, it is the case of a permanent magnet rotor which is activated by an electronic speed controller which is arranged in an electronics housing 13 which is fastened in the manner of a terminal box on the motor housing 5 and via which the electrical connection of the motor is also effected.

The motor housing 5 in this embodiment comprises seven cooling ribs 15 which run transversely to the motor axis 14 and which extend in a longitudinal section 16 over a part of the outer periphery of the motor housing 5. Moreover, the motor housing yet has a longitudinal section 17 which is free of cooling ribs. It extends between the flange 10 and the electronics housing 3.

Figure 2:
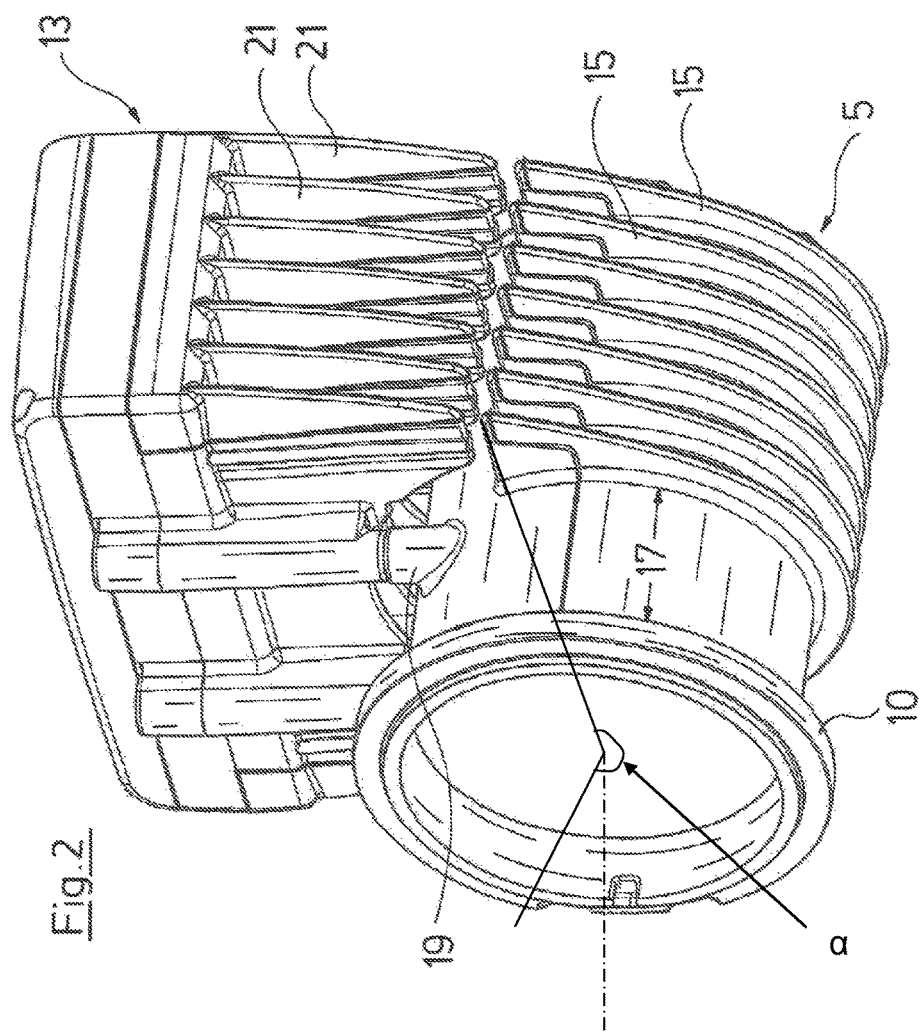
FIG. 2 is a perspective representation showing the motor housing of the electric motor according to FIG. 1, with an electronics housing arranged thereon.
Figure 3:
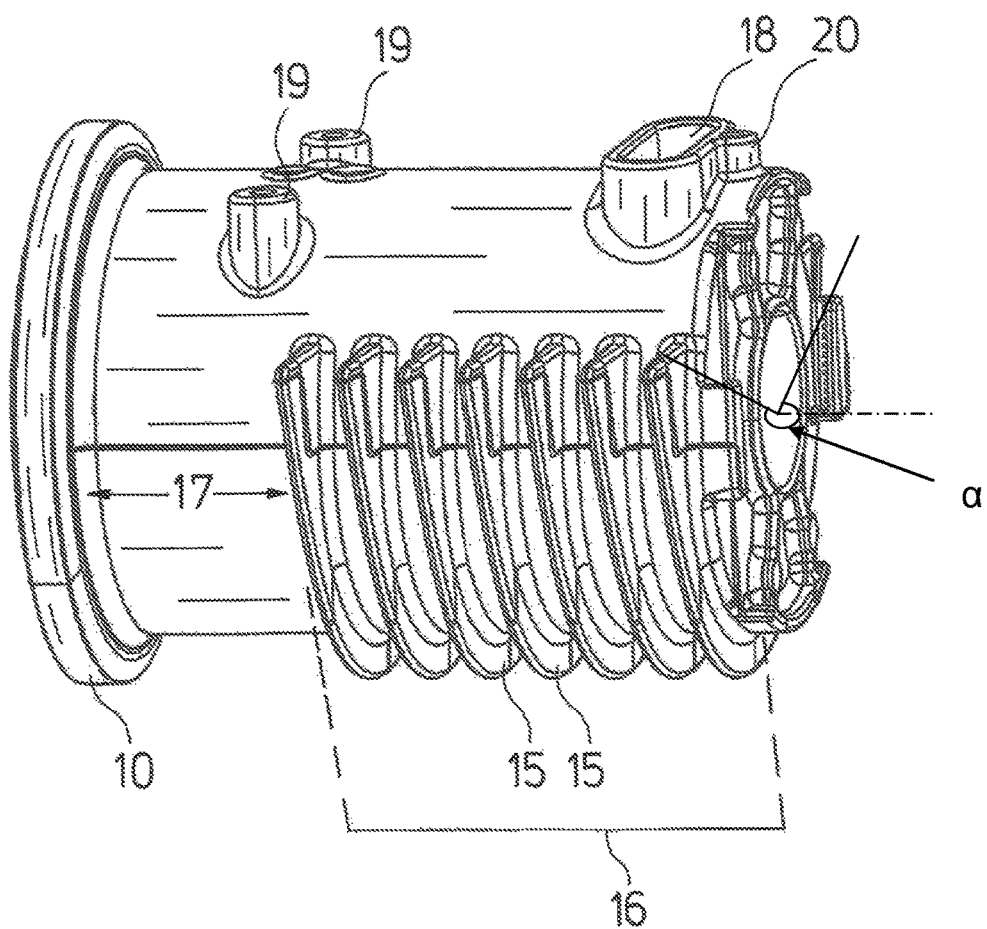
FIG. 3 is a perspective representation showing the motor housing without an electronics housing.

The cooling ribs 15, as is particularly evident from FIG. 3, do not extend over the whole periphery of the motor housing, but over about 210° of the periphery, and specifically in the position according to FIGS. 1 and 2 from the lower side of the motor housing 5 in each case by approximately 105° at both sides to the top. Thereby, the height of the ribs increases significantly from a region of approximately 80° of the periphery (beginning from below) up to the end, as is particularly evident from FIG. 2. In this manner, a rib-free peripheral section of the motor housing 5 results in the region of the longitudinal section 16 of the motor housing 5 which is otherwise provided with ribs 15. In this region, the motor housing 5 close to the free end comprises a base 18 which surrounds an elongate-hole-shaped recess in the motor housing 5 and via which the electrical lead connection between the stator and the electronics housing 13 arranged thereabove is effected. Two bases 19 which are roughly circular in cross section and which serve exclusively for fastening and are each provided with a threaded bore are provided in the rib-free region in a manner distanced to this electronics housing. These three bases 18 and 19 serve for the resting of the electronics housing 13 which lies thereabove and which is screw-fastened in threaded bores of the base 19 and, by way of the wide base 18, is connected to the inside of the stator housing for the purpose of the lead feed-through. The wide base 18 comprises a bulge 20 which is provided with a threaded bore and is envisaged for screw-fastening the electronics housing 13 in this region.

The electronics housing 13, if it is fastened on the motor housing 5, is arranged such that it likewise comprises cooling ribs 21 which are arranged transversely to the motor axis 14 and which, from the essentially rectangular housing which is distanced to the motor housing 5, in the distanced region project downwards up to shortly before the rib-free region in the longitudinal section 16 of the motor housing 5. These ribs which extend from the base of the electronics housing towards the motor housing 5 are arranged aligned to the cooling ribs 21 of the motor housing, so that in the motor position represented in FIGS. 1 and 2, a convection airflow is formed from the lower side of the motor housing and extends upwards up to below the electronics housing and from there to the sides. Due to the non-ribbing of the motor housing 5 in the upper region, i.e. where the electronics housing 13 connects, here the cooling ribs 21 of the electronics housing 13 can be provided, which are designed significantly higher than those of the motor housing 5 and thus form a cooling body on the base of the electronics housing. Due to the fact that the cooling ribs 16 and 21 are designed aligned to one another, independently of the position of the motor—this can be infinitely rotated by 360° with respect to the pump housing 2 in the flange connection—a convection flow between the cooling ribs forms, which effects an intensive cooling, in particular also in the region of the electronics housing 13.

The motor housing 5 and the electronics housing 13 are formed from metal and here it is thereby the case of cast components which consist of a light metal alloy and have a good thermal conductivity.

While specific embodiments of the invention have been shown and described in detail to illustrate the application of the principles of the invention, it will be understood that the invention may be embodied otherwise without departing from such principles.

The invention claimed is:

1. An electric motor, in the form of a wet-running motor for the drive of a centrifugal pump, the electric motor comprising:
   a stator comprising motor windings;
   a motor shaft;
   a rotor connected with the motor shaft, the rotor being rotatably arranged in the stator;
   a motor housing, which receives the stator and which comprises motor housing cooling ribs on a motor housing peripheral side for leading away heat arising in the motor wherein the motor housing cooling ribs only extend over a part of the periphery of the motor housing to define a motor housing cooling rib free area of the motor housing;
   an electronic housing comprising electronic housing cooling ribs, the motor housing cooling ribs extending in a direction transverse to a motor axis and the electronic housing cooling ribs extending continuously, without interruption, from one side of the electronic housing to another side of the electronic housing in the direction transverse to the motor axis, each of the electronic housing cooling ribs extending about a circumferential portion of the motor housing, wherein the electronic housing cooling ribs surround the circumferential portion of the motor housing, each of the electronic housing cooling ribs comprising a cooling rib surface extending continuously, without interruption, in a circumferential direction of the motor housing, relative to the motor axis, from the one side of the electronic housing to the another side of the electronic housing, the cooling rib surface of each of the electronic housing cooling ribs defining a motor housing receiving zone, wherein the motor housing cooling rib free area is arranged in the motor housing receiving zone, each of the electronic housing cooling ribs being located at a spaced location from the motor housing cooling ribs and the motor housing.

2. An electric motor according to claim 1, wherein the motor housing has a round cross section and the cooling ribs extending only over the part of the periphery of the motor housing are only provided as a ribbed portion on an outer peripheral side, each of the motor housing cooling ribs having a first end portion and a second end portion, the cooling rib surface extending continuously, without interruption from the first end portion to the second end portion in the circumferential direction of the motor housing.

3. An electric motor according to claim 1, wherein the cooling ribs extend only in a circumferential region between 190° to 240° of the periphery of the motor housing, wherein the motor housing cooling ribs extend about a circumferential region of the periphery of the motor housing, the circumferential region defining 120° to 170° of a circumferential periphery of the motor housing.

4. An electric motor according to claim 1, wherein the cooling ribs are arranged only over a longitudinal section of the motor housing, and a further longitudinal section comprises a rib-free longitudinal section, wherein no structure is provided between the motor housing and the electronic housing cooling ribs in the motor housing cooling rib free area to define an open space between the motor housing and the electronic housing cooling ribs.

5. An electric motor according to claim 1, wherein the motor housing and/or the electronic housing as cast housings consist of materials with a thermal conductivity of at least 10 W/m K at 0° C., of a light metal alloy.

6. An electric motor according to claim 1, wherein:
   the electronic housing comprises power electronics for the control of the motor;
   the motor housing cooling ribs extending only over a part of the periphery of the motor housing define a ribbed peripheral region and define a remaining non-ribbed peripheral region;
   the motor housing in the non-ribbed peripheral region forms an assembly base for the electronics housing.

7. An electric motor according to claim 6, wherein the electronic housing cooling ribs point towards the motor housing and are aligned with the motor housing cooling ribs, wherein the circumferential direction is transverse to the motor axis.

8. An electric motor according to claim 1, wherein the electronic housing cooling ribs surround a portion of the motor housing.

9. A centrifugal pump electric motor comprising:
a stator comprising motor windings;
a motor shaft comprising a motor shaft longitudinal axis;
a rotor connected with the motor shaft, the rotor being rotatably arranged in the stator;
a motor housing defining an interior space, the stator and at least a portion of the motor shaft being disposed in the interior space, the motor housing having an exterior with motor housing cooling ribs extending only over a part of the periphery of the motor housing defining a ribbed peripheral region and defining a remaining non-ribbed peripheral region located between said motor housing cooling ribs, whereby the motor housing cooling ribs lead heat way from the housing arising in the motor;
an electronics housing comprising power electronics for the control of the motor, said electronics housing comprising electronics housing cooling ribs and a facing surface, said facing surface being free of said electronics housing cooling ribs, at least a portion of one of said electronics housing cooling ribs being arranged adjacent to said facing surface, said electronics housing cooling ribs extending in a circumferential direction of the motor housing transverse to the motor shaft longitudinal axis and the motor housing cooling ribs extending continuously, without interruption, from one side of said electronics housing to another side of said electronics housing in said circumferential direction transverse to the motor shaft longitudinal axis, said electronics housing cooling ribs extending about a circumferential portion of said motor housing, wherein said electronics housing cooling ribs surround said circumferential portion of said motor housing, each of said electronics housing cooling ribs comprising a cooling rib surface extending continuously, without interruption, in said circumferential direction of said motor housing, relative to said motor shaft longitudinal axis, from said one side of said electronics housing to said another side of said electronics housing, said cooling rib surface of each of said electronics housing cooling ribs defining a motor housing receiving zone, wherein said non-ribbed peripheral region is arranged in said motor housing receiving zone, each of said electronics housing cooling ribs being located at a spaced location from said motor housing cooling ribs and said motor housing.

10. An electric motor according to claim 9, wherein the motor housing comprises an assembly base for receiving the electronics housing, the assembly base being located at a position outside of the non-ribbed peripheral region, the non-ribbed peripheral region comprising a non-ribbed peripheral region arcuate contour, the cooling rib surface of each of the electronics housing cooling ribs comprising a cooling rib surface arcuate contour, the cooling rib surface arcuate contour being located opposite the non-ribbed peripheral region arcuate contour.

11. An electric motor according to claim 10, wherein the electronics housing is attached to the assembly base and the electronics housing cooling ribs extend towards the motor housing, wherein the electronic housing cooling ribs surround a portion of the motor housing.

12. An electric motor according to claim 9, wherein the motor housing has a round exterior, with the motor housing cooling ribs extending only over the part of the periphery of the motor housing being curved at the outer peripheral side, each of the motor housing cooling ribs having a first end portion and a second end portion, the cooling rib surface extending continuously, without interruption from the first end portion to the second end portion in the circumferential direction of the motor housing.

13. An electric motor according to claim 10, wherein said facing surface comprises a facing surface base, said facing surface base being arranged opposite said assembly base, said electronics housing cooling ribs being located at a spaced location from said cooling ribs of said motor housing, at least said electronic housing cooling ribs and said remaining non-ribbed peripheral region defining a gap.

14. An electric motor according to claim 12, wherein each housing electronics cooling rib end portion of the electronics housing cooling ribs is aligned with a motor housing cooling rib end portion of the motor housing cooling ribs to define two aligned cooling rib end portions, the two aligned cooling rib end portions defining a gap, wherein no structure is provided between the motor housing and the electronics housing cooling ribs in the non-ribbed peripheral region.

15. An electric motor according to claim 14, wherein at least one of the motor housing and the electronics housing is a cast housings formed of materials with a thermal conductivity of at least 10 W/m K at 0° C. of a light metal alloy.

16. An electric motor according to claim 12, wherein:
the electronics housing cooling ribs extend transversely to a longitudinal axis of said electronics housing;
the cooling rib surface comprises a cooling rib surface contour;
the non-ribbed peripheral region comprises a non-ribbed peripheral region contour;
the non-ribbed peripheral region contour corresponds to the cooling rib surface contour; and
the longitudinal axis of the electronics housing is parallel to the motor shaft longitudinal axis.

17. An electric motor according to claim 16, wherein the cooling ribs extend only in a circumferential region between 190° to 240° of the periphery of the motor housing, wherein the motor housing cooling ribs extend about a circumferential region of the periphery of the motor housing, the circumferential region defining 120° to 170° of a circumferential periphery of the motor housing.

18. An electric motor according to claim 16, wherein the part of the periphery of the motor housing with the ribbed peripheral region has a ribbed longitudinal section that extends over only a portion of a longitudinal extent of the housing adjacent to a rib-free longitudinal section of the part of the periphery.

19. A centrifugal pump electric motor comprising:
a stator comprising motor windings;
a motor shaft comprising a motor shaft longitudinal axis;
a rotor connected with said motor shaft, said rotor being rotatably arranged in said stator;
a motor housing defining an interior space, said stator and said rotor and at least a portion of said motor shaft being disposed in said interior space, said motor housing comprising a motor housing exterior, an electronics housing facing surface and motor housing cooling ribs, each of said motor housing cooling ribs extending from one portion of said motor housing exterior to another portion of said motor housing exterior, wherein each of said motor housing cooling ribs extends only over a portion of a periphery of said motor housing, whereby the cooling ribs lead heat way from the housing arising in the motor, said electronics housing facing surface being free of said motor housing cooling ribs, said electronics housing facing surface being located between said motor housing cooling ribs;

an electronics housing comprising electronics housing cooling ribs and power electronics for the control of the motor, each of said electronics housing cooling ribs comprising a motor housing facing surface, said motor housing facing surface facing in a direction of said electronics housing facing surface, wherein at least a portion of said electronics housing facing surface is located opposite said motor housing facing surface, said motor housing facing surface being arranged between at least an end portion of one of said electronics housing cooling ribs and another end portion of said one of said electronics housing cooling ribs, said electronics housing cooling ribs extending in a circumferential direction of said motor housing transverse to said motor shaft longitudinal axis and said motor housing cooling ribs extending continuously, without interruption, from one side of said electronics housing to another side of said electronic housing in said circumferential direction transverse to the motor shaft longitudinal axis, each of said electronics housing cooling ribs extending about another portion of said periphery of said motor housing, said another portion of said periphery of said motor housing being adjacent to said portion of said periphery of said motor housing, each said electronics housing cooling ribs having a first end, a second end and an electronic housing cooling rib portion extending continuously, without interruption, in said circumferential direction from said first end to said second end, said first end being located on said one side of said electronics housing, said second end being located on said second side of said electronics housing, wherein said first end is located opposite said second end in a direction transverse of said motor shaft longitudinal axis, wherein a contour of said electronic housing cooling rib portion corresponds to a contour of said another portion of said periphery of said motor housing, said electronic housing cooling rib portion of each of said electronics housing cooling ribs defining a motor housing receiving zone, wherein said electronics housing facing surface is arranged in said motor housing receiving zone, each of said electronics housing cooling ribs being located at a spaced location from said motor housing cooling ribs and said motor housing.

20. An electric motor according to claim 19, wherein said electronics housing comprises a motor housing facing base, said motor housing facing base being free of said electronic housing cooling ribs, said electronics housing facing surface comprising an electronics housing facing base, said motor housing facing base being located opposite said electronics housing facing base, said electronics housing cooling ribs being located at a spaced location from said motor housing cooling ribs, at least said motor housing facing surface and said electronics housing facing surface defining a gap, each of said motor housing cooling ribs having a first end portion and a second end portion, each of said motor housing cooling ribs having a motor housing cooling rib first end portion and a motor housing cooling rib second end portion, each of said electronics housing cooling ribs having an electronics housing cooling rib first end portion and an electronics housing cooling rib second end portion, said motor housing cooling rib first end portion being aligned with said electronics housing cooling rib first end portion, said motor housing cooling rib first end portion and said electronics housing cooling rib first end portion defining a first cooling rib gap, said motor housing cooling rib second end portion being aligned with said electronics housing cooling rib second end portion, said motor housing cooling rib second end portion and said electronics housing cooling rib second end portion defining a second cooling rib gap, said another portion of said periphery of said motor housing defining 120° to 170° of a circumference of said motor housing, said portion of said periphery of said motor housing defining 190° to 240° of said circumference of said motor housing.

* * * * *